(12) United States Patent
Rakshit et al.

(10) Patent No.: US 11,418,358 B2
(45) Date of Patent: Aug. 16, 2022

(54) SMART DEVICE ACTIVE MONITORING

(71) Applicant: International Business Machines Corporation, Armonk, NY (US)

(72) Inventors: Sarbajit K. Rakshit, Kolkata (IN); Shubhadip Ray, Secaucus, NJ (US); Victor Povar, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 16/673,386

(22) Filed: Nov. 4, 2019

(65) Prior Publication Data
US 2021/0135897 A1 May 6, 2021

(51) Int. Cl.
*G06F 3/16* (2006.01)
*H04L 12/28* (2006.01)
*G06N 20/00* (2019.01)
*G06N 5/04* (2006.01)
*G06F 1/32* (2019.01)

(52) U.S. Cl.
CPC ............ *H04L 12/282* (2013.01); *G06F 3/167* (2013.01); *G06N 20/00* (2019.01); *H04L 12/2809* (2013.01); *G06F 1/32* (2013.01); *G06N 5/04* (2013.01)

(58) Field of Classification Search
USPC ............ 382/100–107, 153–159; 704/1–275; 725/9–14
See application file for complete search history.

(56) References Cited

U.S. PATENT DOCUMENTS

| 9,812,126 | B2 | 11/2017 | Khan |
| 9,940,929 | B2 | 4/2018 | Vanblon |
| 9,965,247 | B2* | 5/2018 | Jarvis ................... G10L 15/222 |
| 2005/0278409 | A1* | 12/2005 | Kutzik .................. G16H 50/30 709/200 |
| 2017/0311261 | A1 | 10/2017 | Mozer |
| 2019/0122692 | A1 | 4/2019 | Binder |
| 2019/0267005 | A1* | 8/2019 | Owens ................... G10L 15/18 |
| 2019/0371342 | A1* | 12/2019 | Tukka ................... H04M 1/724 |
| 2020/0349935 | A1* | 11/2020 | Smith ..................... G10L 15/22 |

OTHER PUBLICATIONS

"Baidu Showcases Major Advances in AI Assistant Ecosystem with DuerOS 5.0 and New Product Innovation," Baidu, Inc., Jul. 3, 2019, 3 pages. <https://web.archive.org/web/20190705114022/https://www.globenewswire.com/news-release/2019/07/03/1877658/0/en/Baidu-Showcases-Major-Advances-in-AI-Assistant-Ecosystem-with-DuerOS-5-0-and-New-Product-Innovation.html>.
Bhutani et al., "Global Smart Speaker Market Size worth over $30bn by 2024," Global Market Insights, Inc., Press Release, Jul. 23, 2018, 6 pages, <https://www.gminsights.com/pressrelease/smart-speaker-market>.

(Continued)

*Primary Examiner* — Marcellus J Augustin
(74) *Attorney, Agent, or Firm* — Brian Welle

(57) ABSTRACT

A wake-up command is received from a user. A smart device for receiving is awakened for processing a user prompt in response to receiving the wake-up command. A user-defined event is received within the user prompt. During the user-defined event, the smart device is to remain awake and monitor a predetermined set of user activities without additional wake-up commands. The predetermined set of user activities is monitored during the user-defined event using the smart device.

17 Claims, 3 Drawing Sheets

(56) References Cited

OTHER PUBLICATIONS

Boehret, "Amazon Tap review: Alexa's magic is gone," The Verge, Apr. 6, 2016, 5 pages. <https://www.theverge.com/2016/4/6/11371814/amazon-tap-review-alexa-echobluetooth-speaker>.

Broida, "Your Amazon Tap no longer requires tapping, just 'Alexa'," CNET, Feb. 9, 2017, 2 pages. <https://www.cnet.com/how-to/how-to-enable-hands-free-mode-on-the-amazon-tap/>.

* cited by examiner

SMART DEVICE ACTIVE MONITORING

BACKGROUND

Artificial intelligence (AI) response devices ("smart devices") may be configured to be placed near users and respond to audible prompts following a required wake-up command. These smart devices may be configured to only respond to commands after they hear such a wake-up command. Once the wake-up command is received and a corresponding voice command is executed, the smart device may go back into "sleep mode." For example, a user may awake the smart device, after which the user may ask what the weather is like outside. Or the user may awake the smart device and ask the smart device to execute one or more automation tasks. Whatever the command is, these smart devices may be configured to go back into sleep mode after the commands are executed, such that the smart devices do not record or store information of a user following the smart devices being put to sleep.

SUMMARY

Aspects of the present disclosure relate to a method, system, and computer program product relating to actively monitoring with a smart device. The method may include receiving a wake-up command from a user. A smart device for receiving is awakened for processing a user prompt in response to receiving the wake-up command. A user-defined event is received within the user prompt. During the user-defined event, the smart device is to remain awake and monitor for a predetermined set of user activities without additional wake-up commands. The predetermined set of user activities is monitored during the user-defined event using the smart device. A system and computer product configured to perform the above method are also disclosed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
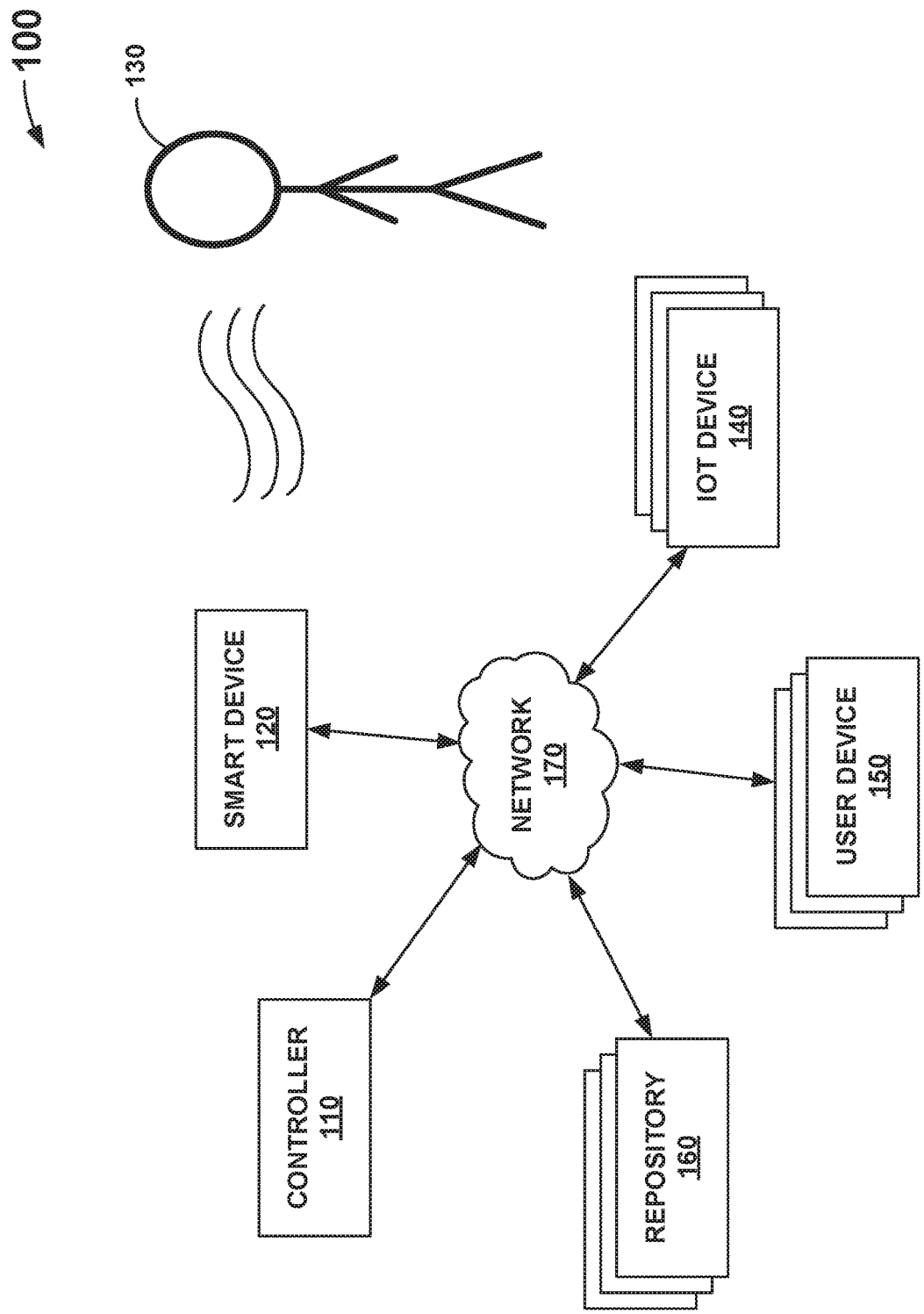
FIG. 1 depicts a conceptual diagram of a system in which a controller may cause a smart device to actively monitor a user.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to artificial intelligence (AI) response devices (hereinafter referred to as "smart devices"), while more particular aspects relate to configuring smart devices to remain awake to monitor user-defined events for predetermined activities. While the present disclosure is not necessarily limited to such applications, various aspects of the disclosure may be appreciated through a discussion of various examples using this context.

Smart devices may be configured to respond to user requests, commands, questions, or the like. For example, a smart device may automate the functionality of Internet of Things (IoT) devices of a home network in response to a user request. For another example, a smart device may respond to a general question, such as a question relating to the weather or the like. The functionality of such smart devices is rapidly growing, particularly as IoT devices themselves becomes more common and powerful.

Smart devices are often designed to respond to many types of commands, such as voice commands, tactile commands (e.g., as provided on a surface of the smart device), electric commands sent to the smart device via a cell phone, or the like. Many smart devices are designed to be "asleep," which is to say not actively sending data of users to a central storage and/or analysis location, until after a "wake up" command is identified. For example, a smart device may constantly analyze for such a wake-up command, and disregard (e.g., neither store nor analyze) audible information that does not include such a wake-up command. Further, the smart device may be configured to go back asleep substantially immediately after the smart device executes the immediate command of the user. One example reason that conventional systems configure smart devices to go back to sleep after performing an action relates to privacy concerns. Another example is to provide a technique for distinguishing when a user is addressing the smart device rather than addressing another individual in the vicinity of the smart device. In other words, the wake-up command is used for the smart device to be alerted that what follows the wake-up command is directed to the smart device.

In some examples, a user may want a smart device to provide the user information on or relating to the user. For example, a user may ask the smart device to take a picture of the user (e.g., from an IoT device that includes a camera), or the user may ask the smart device to record audio of the user, or the like. In some examples, given the programming of a conventional smart device, the smart device may only be able to fulfill such a request immediately after receiving the wake-up command, as after this the immediate time period the smart device may be configured to go back asleep.

Aspects of the disclosure relate to configuring a smart device to actively monitor a predetermined set of user activities for a user-defined event, such that the smart device is awake during this event for at least the predetermined set of user activities. As used herein, the set of user activities being "predetermined" may include the system identifying the closed set of user activities which the system is to actively monitor prior to the system commencing this monitoring (e.g., whether by identifying the predetermined set of user-defined activities from a database of predetermined user-defined activities, or identifying the predetermined set of user defined activities from a prompt that requests that the system actively monitor the user). Aspects of the disclosure may further be configured to predict subsequent events that fit the user provided criteria of the events. The system may further provide notifications to any users that are in the vicinity (e.g., in a home or in a room of the smart device), such that these users may take actions to avoid being monitored and/or modify/stop this active monitoring for at least a period during which these users are in the vicinity.

Further, the system may determine if another user provided another prompt during the monitoring event, and respond to this question appropriately. The system may only monitor a subset of things during the predicted period. In this way, the aspects of this disclosure may be configured to provide a more robust version of monitoring while also addressing potential privacy concerns.

For example, FIG. 1 depicts system 100 in which controller 110 enables smart device 120 to actively monitor user 130. Controller 110 may include a computing device, such as computing device 200 of FIG. 2 that includes a processor communicatively coupled to a memory that includes instructions that, when executed by the processor, causes controller 110 to execute one or more operations described below. As described above, smart device 120 may include an artificial intelligence (AI) response device that is configured to intelligently respond to prompts. Though, for purposes of clarity, controller 110 is depicted as a separate device from smart device 120, in other examples, controller 110 may be integrated into smart device 120 or vice versa.

Smart device 120 may respond to prompts from user 130. User 130 may be any human that is in a vicinity of smart device 120, where the vicinity is a room of smart device 120, a home of smart device 120, a distance of smart device 120, or the like. In some examples, only a predetermined set of people may be identified as users 130 as defined herein, such as people that are living in the home of smart device 120.

The prompts include home automation prompts, such as a prompt to change a state of one or more IoT devices 140. IoT devices 140 may include a plurality of computing devices, security systems, home appliances, or the like. For example, IoT devices 140 may include televisions, security cameras, kitchen appliances, heating ventilation and cooling (HVAC) appliances, speakers, an intelligent bed, a webcam, or the like.

Smart device 120 may control IoT devices 140 over network 170. Network 170 may include a computing network over which computing messages may be sent and/or received. For example, network 170 may include the Internet, a local area network (LAN), a wide area network (WAN), a wireless network such as a wireless LAN (WLAN), or the like. Network 170 may comprise copper transmission cables, optical transmission fibers, wireless transmission, routers, firewalls, switches, gateway computers and/or edge servers. A network adapter card or network interface in each computing/processing device (e.g., controller 110, smart device 120, IoT devices 140, user devices 150, and or repository 160) may receive messages and/or instructions from and/or through network 170 and forward the messages and/or instructions for storage or execution or the like to a respective memory or processor of the respective computing/processing device. Though network 170 is depicted as a single entity in FIG. 1 for purposes of illustration, in other examples network 170 may include a plurality of private and/or public networks.

Controller 110 may detect a wake-up command to smart device 120 from user 130. The wake-up command may include a predetermined verbal command that is relatively unlikely to be said accidentally (such that smart device 120 is relatively unlikely to wake up accidentally). In response to this wake-up command, smart device 120 may awaken to receive and process a user prompt. This user prompt may define an event during which user 130 requests that smart device 120 actively monitor user 130. The user prompt may define the event by providing a time range during which the event will occur. Additionally, or alternatively, the user prompt may define the event by describing the event. In some examples, the user prompt may further provide details on how smart device 120 is to actively monitor user 130 during the event. In other examples, controller 110 may reference one or more repositories 160 to determine how to actively monitor user 130 during the event. As a result of this wake-up command, controller 110 may cause smart device 120 to remain awake during the event (and/or to subsequently awaken, when the event is in the future), at least for purposes of monitoring the user activities.

For example, following a wake-up command, user 130 may provide an additional user prompt of "tell me my rate of speech for the next 50 minutes." In response to this, controller 110 may use natural language processing (NLP) techniques to identify that the event is the next 50 minutes, such that user 130 wants controller 110 to remain awake until 50 minutes elapses. Further, controller 110 may analyze the user prompt to determine that the user activities include words audible spoken. In response to this user prompt, controller 110 may cause smart device to actively count a number of words spoken per minute by user 130 for the next 50 minutes. Smart device 120 may use a microphone of smart device 120, and/or smart device 120 may use microphones of one or more IoT devices 140. Smart device 120 may disregard (e.g., not store or analyze) other data that smart device 120 and/or IoT devices 140 can gather during this time. For example, smart device 120 may avoid storing or analyzing the actual words spoken by user 130, instead only analyzing the number words spoken. In some examples, controller 110 may store all data that controller 110 determines might be relevant, and later using machine learning techniques as described herein to identify and anticipate future commands.

Following the fifty minutes, controller 110 may provide a report to user 130. This report may include data on the user activities specified by user 130, such as the spoken rate of words, and whether this rate increased or decreased over the 50 minutes. In some examples, controller 110 may electronically send this report as a document or text message to user 130, such as over network 170. In other examples, controller 110 may cause smart device 120 to audibly provide this information to user 130. For example, controller 110 may cause smart device 120 to audibly provide one or more metrics of the report to user 130 following the 50-minute deadline. Alternatively, and/or additionally, controller 110 may cause smart device 120 to respond to user prompts about these metrics with the appropriate answers.

In some examples, controller 110 may utilize machine learning techniques as described herein to improve at identifying user activities to monitor and/or at providing the report. For example, following the 50 minutes, user 130 may ask smart device 120 how many times the user said "um" during the 50 minutes. Given that the user prompt did not specify storing this information, controller 110 may cause smart device 120 to answer that this information was not gathered or stored and cannot be provided. However, controller 110 may update within repository 160 a preference of the user to record a number of "ums" spoken during similar events. In this way, controller 110 may improve at causing smart device to actively monitor over time.

Controller 110 may also cause smart device 120 to monitor in other ways for other types of events. For example, controller 110 may detect a user prompt of "keep awake until I finish this homework." In this example, an event of "doing homework" is identified. In response to this, controller 110 may cause smart device 120 or other IoT 140 devices controlled by smart device 120 to monitor the event. For example, controller 110 may cause smart device 120 to use internet of things (IoT) devices 140 such as a camera to track the event. Controller 110 may further cause smart device 120 to continue actively monitoring the event. Controller 110 may disregard information such as verbal information, exclusively focusing on physical actions of user 130 during the event. Following this, controller 110 may provide a report as described herein that provides metrics on how on task user 130 was during the homework, and/or how long homework lasted. In some examples, controller 110 may keep track of this over a course of days or weeks, and may provide a report (e.g., to user 130 and/or to a parent of user 130) after a period of time.

For another example, controller 110 may identify a user prompt from user 130 of "monitor me while I cook food." In response to this, controller 110 may cause smart device 120 to watch a kitchen using IoT device 140 webcam over a kitchen, gather data from one or more IoT device 140 kitchen appliances, gather audio data from one or more IoT device 140 microphones in the kitchen, or the like. Controller 110 may there generate a report from such monitoring, such as nutritional values of what is being cooked, ingredients that are being used (which may correspondingly be used to create a shopping list), an amount of time that is being spent cooking, an accuracy of cooking techniques (e.g., whether an appropriate amount of heat is used), or the like.

In certain examples, controller 110 can be configured to identify user prompts related to cooking as being part of the predetermined set of user activities, therein processing and analyzing such prompts without an additional wake-up command. To continue the user-defined cooking event example, controller 110 may determine to respond to user prompts related to cooking. identified as being related to cooking. For example, controller 110 could identify a user prompt of "how many teaspoons are in a tablespoon" as being related to cooking and thus, process and provide an answer to the user prompt without an additional wake-up command. Conversely, controller 110 may identify a user prompt of "what's on TV right now" as not being related to cooking, such that controller 110 does not allow smart device 120 to process and/or respond to the user prompt until being further woken up by wake-up command. In this way, controller 110 may be configured to respond to user's 130 event related prompts without an additional wake-up command while disregarding other potential prompts (that are not preceded by a wake-up command) as not being related to the event.

Further, as described herein, controller 110 may learn to predict future events. For example, after being asked to monitor user 130 during cooking a threshold number of times, controller 110 may cause smart device 120 to ask user 130 if user 130 wants smart device 120 to actively monitor future cooking events (where if user 130 responds in the affirmative, controller 110 may detect future cooking events). Alternatively, or additionally, within a user prompt user 130 may request that smart device 120 actively monitor future cooking events. In either example, controller 110 may detect future events and begin actively monitoring even without a subsequent wake-up command from user 130. For example, controller 110 may cause smart device 120 to passively gather IoT device 140 data for a wake-up command that includes a kitchen appliance turning on, which controller 110 may detect as a start of a cooking event.

Controller 110 may provide notifications to users that enter a vicinity in which smart device 120 is actively monitoring. Controller 110 may send (or cause smart device 120 to send) this notification without a specific wake-up command related to such notification. For example, controller 110 may detect that a new user device 150 (e.g., a new cell phone) becomes connected to a WLAN network 170 of smart device 120. User devices 150 may include computing devices (e.g., devices similar to computing device 200 of FIG. 2) such as mobile phones, tablets, laptops, or the like. For another example, controller 110 may detect a new voice in the vicinity, or observe (e.g., using a camera that is actively monitoring user 130) a new user in the vicinity, or the like. However the new user is detected, in response to this detection, controller 110 may provide an audible alert of the active monitoring. For example, controller 110 may cause a speaker of smart device 120 and/or an IoT device 140 speaker to provide the audible notification, "hello! I am currently monitoring Jimmy doing his homework." In other examples, controller 110 may provide a notification directly to this new user device 150, such as with a direct text message to a cell phone user device 150. The new user may inform smart device 120 to discard data of the new user, and/or to stop active monitoring for the duration of the time when the new user is in the vicinity of smart device 120.

User 130 can subsequently interact with smart device 120 regarding the data that was gathered during the active monitoring event. For example, user 130 may request that smart device 120 monitor how user 130 sleeps. Following this, smart device 110 may cause smart device 120 to gather data from IoT device 140 smart bed in response to smart bed IoT device 140 detecting user 130 getting into bed. Controller 110 may store all or some of this sleeping data (which may include movement data, snoring data, or the like) in repository 160. Following this, user 130 awakens smart device 120 and provides a user prompt that inquires how often and for how long user 130 snored during the most recent sleeping event. Controller 110 may identify that this user prompt related to an active monitoring event, and may analyze the gathered data from this event as stored on repository 160 to answer the user prompt.

For another example, user 130 may ask smart device 120 to quiz user 130 regarding material that was studied from a previous study session. Controller 110 may once again identify this study session (and material thereof) as stored in repository 160, and cause smart device 120 to provide questions from the study session, including answers as gathered from the study session.

For another example, user 130 may ask smart device 120 how a presentation went. Controller 110 may identify that this related to a presentation that was just presented to smart device 120. Controller 110 may cause smart device 120 to provide information and/or analytics on the presentation, such as a duration, an amount of eye contact, a posture during the presentation, an amount of "ums" or "ahs" that were communicated, or the like.

Controller 110 may further be configured to cause smart device 120 to function as "normal" (e.g., responding to a wake-up command to respond to user prompts) during an active monitoring event. During this event, controller 110 may cause smart device 120 to still actively monitor, even as smart device 120 answers or otherwise responds to prompts providing to smart device 120. Put differently, smart device 120 and/or controller 110 may be configured to actively monitor user 130 for the predetermined set of user activities during an event while also responding to other simultaneous user prompts that are in the "normal" or conventional aspect of functions of smart device 120.

In some examples, the user prompt to smart device 120 that requests that smart device 120 actively monitor during an event may explicitly or implicitly specify the predetermined user activities for which smart device 120 is to monitor. For example, the user prompt from user 130 may include an audible command of, "please monitor my stride and heartbeat during my jog," in response to which controller 110 may determine to gather visual data (e.g., from camera IoT device 140) and biometric data (e.g., from smart watch IoT device 140). In another example, where the user prompt did not expressly identify user activities for which smart device 120 should monitor, controller 110 may look to repository 160 to identify user activities associated with the event. In either example, controller 110 may identify a set of user activities for which smart device 120 will monitor prior to smart device 120 monitoring. Put differently, smart device 120 may only begin monitoring once controller 110 identifies a closed predetermined list of user activities for which smart device 120 is to monitor. Further, as described herein, controller 110 may improve at identifying what type of data to gather over time as user 130 provides feedback regarding the gathered data from the monitored event.

Figure 2:
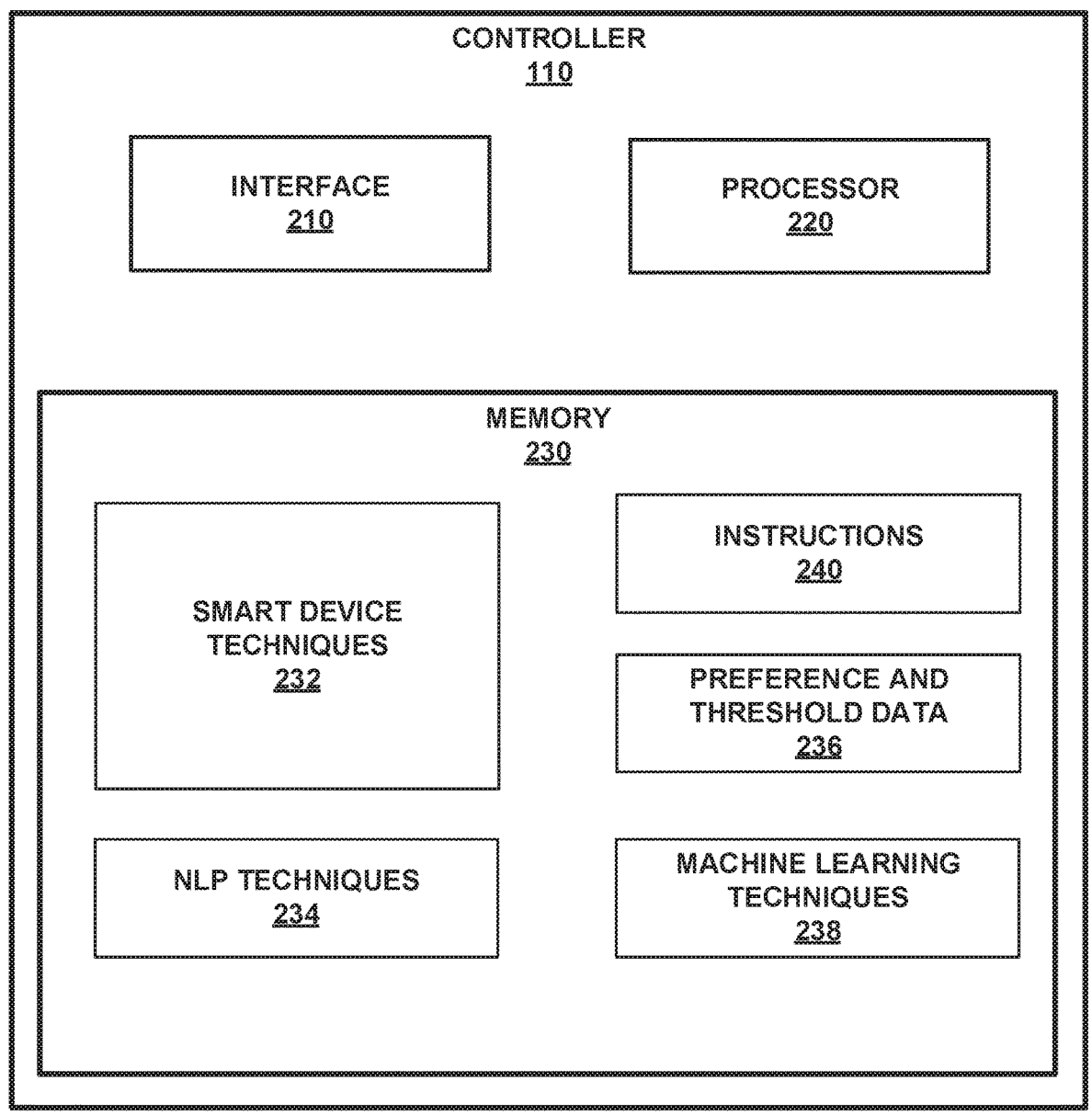
FIG. 2 depicts an example box diagram of the controller of FIG. 1.

As described above, a computing device 200 with a processor configured to execute instructions stored on a memory may execute the techniques described herein. For example, FIG. 2 is a conceptual box diagram of such computing device 200. While computing device 200 is depicted as a single entity (e.g., within a single housing) for the purposes of illustration, in other examples, controller 110 may include two or more discrete physical systems (e.g., within two or more discrete housings). Computing device 200 may include interfaces 210, processor 220, and memory 230. Computing device 200 may include any number or amount of interface(s) 210, processor(s) 220, and/or memory(s) 230.

Computing device 200 may include components that enable controller 110 to communicate with (e.g., send data to and receive and utilize data transmitted by) devices that are external to computing device 200. For example, computing device 200 may include interface 210 that is configured to enable computing device 200 and components within computing device 200 (e.g., such as processor 220) to communicate with entities external to computing device 200. Interface 210 may include one or more network interface cards, such as Ethernet cards, and/or any other types of interface devices that can send and receive information. Any suitable number of interfaces may be used to perform the described functions according to particular needs.

As discussed herein, computing device 200 may be configured to actively monitor using smart device 120. Controller 110 may utilize processor 220 to actively monitor using a smart device. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to actively monitor using smart device 120.

Processor 220 may to actively monitor using smart device 120 according to instructions 240 stored on memory 230 of computing device 200. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may actively monitor using a smart device according to instructions 240 of one or more applications (e.g., software applications) stored in memory 230 of computing device 200.

In addition to instructions 240, in some examples gathered or predetermined data or techniques or the like as used by processor 220 to actively monitor using a smart device may be stored within memory 230, such as smart device techniques 232. Smart device techniques 232 may include the techniques with which smart device 120 operates as described above, for examples in which smart device 120 and controller 110 are integrated into a single device.

Additionally, memory 230 may include NLP techniques 234 with which controller 110 may analyze user prompts or verbal information gathered during events or the like. NLP techniques 234 can include, but are not limited to, semantic similarity, syntactic analysis, and ontological matching. For example, in some embodiments, processor 220 may be configured to parse comments spoken by user 130 during a homework session to determine semantic features (e.g., word meanings, repeated words, keywords, etc.) and/or syntactic features (e.g., word structure, location of semantic features in headings, title, etc.) of the comments. Ontological matching could be used to map semantic and/or syntactic features to a particular concept. The concept can then be used to determine the subject matter. In this way, using NLP techniques 234, controller 110 may, e.g., identify content that was particularly interesting or challenging to user 130 during a homework session, and therein later quiz user 130 with questions regarding these concepts at a later time.

Memory 230 may also include preference and threshold data 236. Preference and threshold data 236 may include one or more thresholds that indicate that a monitoring event is ongoing. For example, preference and threshold data 236 may include a threshold weight as gathered by smart bed IoT device 140 that indicates that user 130 is in bed and a sleeping event is about to begin (e.g., versus a cat jumping on the bed). Further, preference and threshold data 236 may include thresholds of user activities that are predetermined for a particular monitoring event, such as a distance threshold from an oven within which users are to be monitored during a cooking event. In some examples, preference and threshold data 236 may include preferences or thresholds that are unique to some users. For example, preference and threshold data 236 may include an indication that a first user prefers to have visual data gathered during a presentation (e.g., posture and gestures or the like), while a second user prefers to have specific timing data gathered (e.g., how long a presentation takes, and/or a general rate of speech), or the like.

Memory 230 may further include machine learning techniques 238 that computing device 200 may use to improve a process of active monitoring over time. Machine learning techniques 238 can comprise algorithms or models that are generated by performing supervised, unsupervised, or semi-supervised training on a dataset, and subsequently applying the generated algorithm or model to actively monitor according to preference and threshold data 236.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Figure 3:
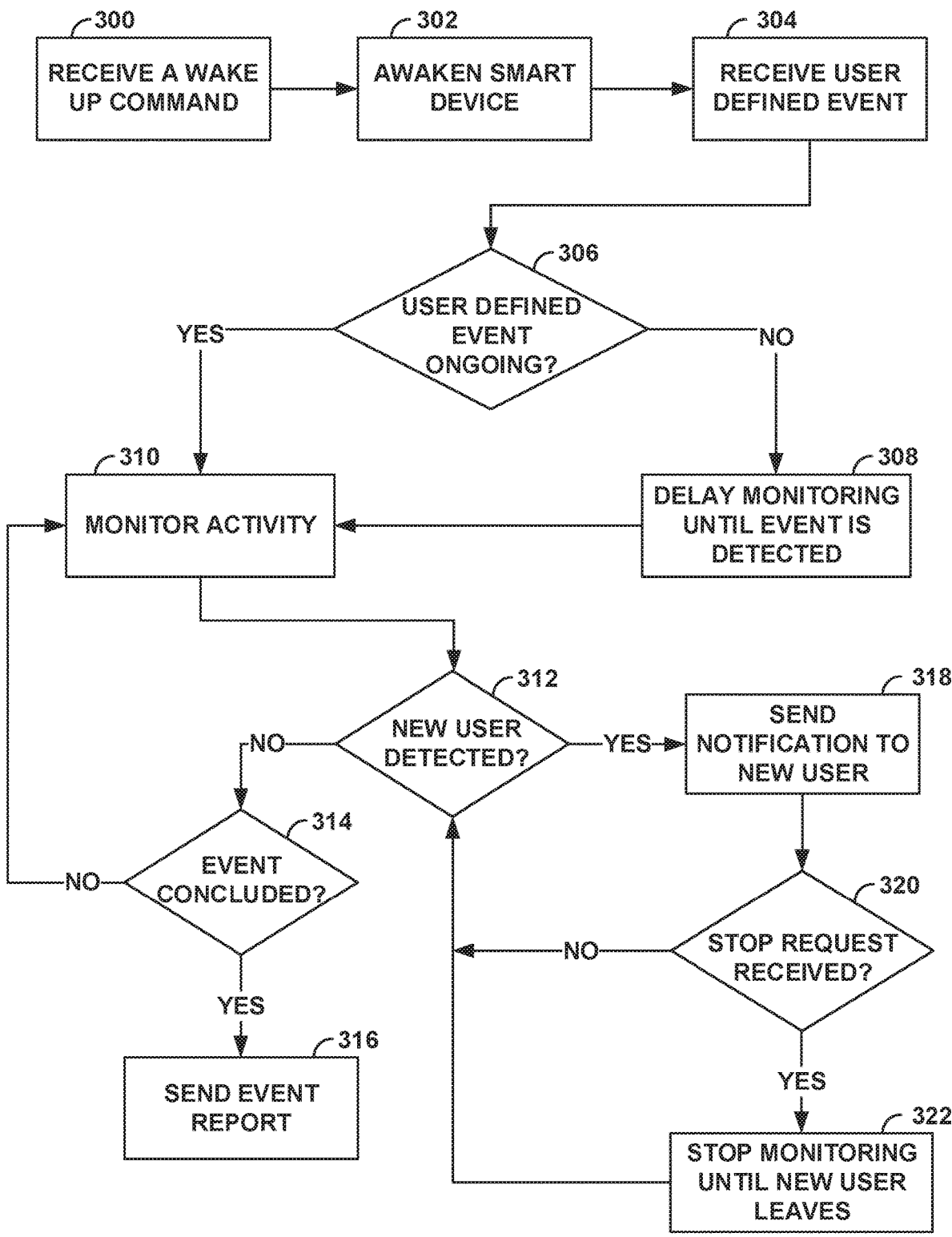
FIG. 3 depicts a flowchart of a method of actively monitoring using a smart device.

Using these components, controller 110 may actively monitor using smart devices 120 as discussed herein. For example, controller 110 may actively monitor according to the flowchart depicted in FIG. 3. The flowchart of FIG. 3 is discussed with relation to FIG. 1 for purposes of illustration, though it is to be understood that other systems may be used to execute the flowchart of FIG. 3 in other examples. Further, in some examples controller 110 may execute a different method than the flowchart of FIG. 3, or controller 110 may execute a similar method with more or less steps in a different order, or the like.

Controller 110 may detect that smart device 120 receives a wake-up command (300). The wake-up command may be configured to awaken smart device 120, such that once detected, smart device 120 awakens (302). Following the wake-up command, smart device 120 may receive a user defined event (304). The user defined event may be received with a user prompt as described herein. For example, controller 110 may detect a user prompt of "please monitor while my friend and I discuss our travel plans."

In response to this, controller 110 may determine if this event (user 130 and the friend discussing the travel plans) has already started (306). If the event has not started (e.g., as a result of the friend not being there, or user 130 and the friend discussing other things as identified using NLP techniques), controller 110 may delay active monitoring until the event is detected (308). Controller 110 may delay the active monitoring by temporarily adding words related to the event to a pool of potential wake-up commands, such that smart device 120 is awakened by a phrase, "anyway, ready to discuss the trip?" or the like. Once the event is detected (and/or if the event was detected as ongoing in step 306), controller 110 may cause smart device 120 to gather data on the predetermined set of user activities of the event (310). Event data of the predetermined set of user activities may be gathered via relevant IoT devices 140.

Controller 110 may monitor whether or not new users are detected (312). New users may be detected via user devices 150 of these users connecting to network 160 of smart device 120. Additionally, or alternatively, new users may be detected via visual or audible data gathered during the event, or the like. If no new users are detected, controller 110 may continue gathering data of the predetermined set of user activities until controller detects that the event is concluded (314). As depicted in FIG. 3, controller 110 may continue in a pseudo-indefinite loop monitoring activity (310), monitoring for new users (312), and analyzing whether or not the event is concluded (314). Once controller 110 detects that the user-defined event is concluded, controller 110 may send an event report to user 130 (316). This report may include metrics of the event. Additionally, or alternatively, controller 110 may interact with user 130 via monitored data as discussed herein.

In some examples, as described herein, controller 110 may detect that a new user is in the vicinity (at 312). In response to this detection, controller 110 may send a notification of the ongoing active monitoring to the new user (318). This notification may include a text message or audible alert or the like. Controller 110 may then determine whether or not the new user transmits a request for smart device 120 to stop active monitoring and go to sleep (320). Such a request may be transmitted as a user prompt as described herein. If no such request is received from the user, controller 110 may continue with the active monitoring loop (310, 312, 314). If controller 110 does detect a stop request, controller 110 may cause smart device 120 to stop the active monitoring for this event and go to sleep (322). Controller 110 may continue monitoring whether or not the new user is still in the vicinity, and awaken smart device 120 to resume the active monitoring loop (310, 312, 314) if and when the new user is no longer in the vicinity. In some examples, only some privileged users may have an ability to stop active monitoring.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method comprising:
receiving a wake-up command from a user;
awakening, in response to receiving the wake-up command, a smart device for receiving and processing a user prompt;
receiving, within the user prompt, a user-defined event during which the smart device is to remain awake and monitor a predetermined set of user activities without additional wake-up commands;
monitoring the predetermined set of user activities during the user-defined event using the smart device;
detecting a presence of a second user while monitoring the predetermined set of user activities during the user-defined event and providing a notification to the second user that the smart device is awake without requiring additional wake-up commands.

2. The computer-implemented of claim 1, wherein receiving the user-defined event includes receiving a specified amount of time to remain awake.

3. The computer-implemented method of claim 1, wherein receiving the user-defined event includes receiving identification of a currently ongoing event and user input for the smart device to remain awake until completion of the currently ongoing event.

4. The computer-implemented method of claim 1, wherein receiving the user-defined event includes receiving identification of a future event and user input for the smart device to awaken when the future event is detected and remain awake until completion of the future event.

5. The computer-implemented method of claim 4, wherein the presence is detected by detecting that a user device associated with the second user is connecting to a wireless network of the smart device.

6. The computer-implemented method of claim 5, wherein the notification is sent to the user device associated with the second user.

7. The computer-implemented method of claim 5, further comprising: receiving, from the user device associated with the second user, a request for the smart device to go to sleep; putting the smart device to sleep in response to the request; and awakening the smart device to continue monitoring the predetermined set of user activities during the user-defined event in response to detecting that the user device associated with the second user is no longer connected to the wireless network.

8. The computer-implemented method of claim 1, further comprising providing a report to the user regarding the monitored set of user activities following the user-defined event.

9. A system comprising:
a processor; and
a memory in communication with the processor, the memory containing instructions that, when executed by the processor, cause the processor to:
receive a wake-up command from a user;
awaken, in response to receiving the wake-up command, a smart device for receiving and processing a user prompt;
receive, within the user prompt, a user-defined event during which the smart device is to remain awake and monitor a predetermined set of user activities without additional wake-up commands;
monitor the predetermined set of user activities during the user-defined event using the smart device;
detect a presence of a second user while monitoring the predetermined set of user activities during the user-defined event; and
provide a notification to the second user that the smart device is awake without requiring additional wake-up commands.

10. The system of claim 9, wherein receiving the user-defined event includes one of:
receive a specified amount of time to remain activated;
receive identification of a currently ongoing event and user input for the smart device to remain awake until completion of the currently ongoing event; and
receive identification of a future event and user input for the smart device to awaken when the future event is detected and remain awake until completion of the future event.

11. The system of claim 10, wherein the presence is detected by detecting that a user device associated with the second user is connecting to a wireless network of the smart device.

12. The system of claim 11, wherein the notification is sent to the user device associated with the second user.

13. The system of claim 1, the memory further containing instructions that, when executed by the processor, cause the processor to: receive, from the user device associated with the second user, a request for the smart device to go to sleep; put the smart device to sleep in response to the request; and awaken the smart device to continue monitoring the predetermined set of user activities during the user-defined event in response to detecting that the user device associated with the second user is no longer connected to the wireless network.

14. The system of claim 9, the memory further containing instructions that, when executed by the processor, cause the processor to provide a report to the user regarding the monitored set of user activities following the user-defined event.

15. A computer program product, the computer program product comprising a computer readable storage medium having program instructions embodied therewith, the program instructions executable by a computer to cause the computer to:
receive a wake-up command from a user;
awaken, in response to receiving the wake-up command, a smart device for receiving and processing a user prompt;
receive, within the user prompt, a user-defined event during which the smart device is to remain awake and monitor a predetermined set of user activities without additional wake-up commands;
monitor the predetermined set of user activities during the user-defined event using the smart device;
detect a presence of a second user while monitoring the predetermined set of user activities during the user-defined event by detecting that a user device associated with the second user is connecting to a wireless network of the smart device; and
provide a notification to the user device associated with the second user that the smart device is awake without requiring additional wake-up commands.

16. The computer program product of claim 15, wherein receiving the user-defined time period includes one of:
receive a specified amount of time to remain activated;
receive identification of a currently ongoing event and user input for the smart device to remain awake until completion of the currently ongoing event; and
receive identification of a future event and user input for the smart device to awaken when the future event is detected and remain awake until completion of the future event.

17. The computer program product of claim 16, the readable storage medium comprising additional program instructions that, when executed by the computer, cause the computer to: receive, from the user device associated with the second user, a request for the smart device to go to sleep; put the smart device to sleep in response to the request; and awaken the smart device to continue monitoring the predetermined set of user activities during the user-defined event in response to detecting that the user device associated with the second user is no longer connected to the wireless network.

* * * * *